(12) United States Patent
Krenzel

(10) Patent No.: US 6,390,021 B1
(45) Date of Patent: May 21, 2002

(54) BIRD FEEDER

(75) Inventor: Ron Krenzel, 8504 N. 95th, Longmont, CO (US) 80504

(73) Assignee: Ron Krenzel, CO (US)

( * ) Notice: Subject to any disclaimer, the term of this patent is extended or adjusted under 35 U.S.C. 154(b) by 0 days.

(21) Appl. No.: 09/516,672

(22) Filed: Mar. 1, 2000

(51) Int. Cl.⁷ .............................................. A01K 39/00
(52) U.S. Cl. ...................... 119/52.2; 119/52.1; 119/53; 119/57.8
(58) Field of Search .................. 119/52.1, 52.2, 119/52.3, 53, 57.8, 61, 77; 222/460

(56) References Cited

U.S. PATENT DOCUMENTS

| | | | |
|---|---|---|---|
| 2,789,534 A | * 4/1957 | Landgraf | 119/52.1 |
| 4,026,244 A | 5/1977 | Salick | 119/51 R |
| D251,021 S | 2/1979 | Blasbalg | D30/15 |
| 4,144,842 A | 3/1979 | Schlising | 119/52 R |
| 4,664,066 A | * 5/1987 | Steuernagle et al. | 119/52.2 |
| 4,955,319 A | 9/1990 | Brucker | 119/52.2 |
| 5,033,411 A | 7/1991 | Brucker | 119/52.1 |
| 5,195,463 A | * 3/1993 | Lorenzana | 119/77 |
| 5,199,382 A | * 4/1993 | Adriano | 119/57.4 |
| 5,423,291 A | * 6/1995 | Daugherty | 119/77 |
| 5,479,881 A | 1/1996 | Lush et al. | 119/57.8 |
| 5,682,835 A | * 11/1997 | Walter et al. | 119/57.8 |
| 5,740,758 A | 4/1998 | Damm | 119/57.8 |
| 5,975,015 A | * 11/1999 | Runyon et al. | 119/52.1 |

* cited by examiner

Primary Examiner—Charles T. Jordan
Assistant Examiner—John W. Zerr
(74) Attorney, Agent, or Firm—Sheridan Ross P.C.

(57) ABSTRACT

The bird feeder of the present invention includes a dispenser suitable for receiving, holding and dispensing bird feed into a receptacle suspended below the dispenser. At least one of the dispenser and receptacle is at least partially collapsible to form a lower profile for storage or packaging.

4 Claims, 5 Drawing Sheets

BIRD FEEDER

FIELD OF THE INVENTION

This invention generally relates to bird feeders and, more particularly, to bird feeders with at least one collapsible component.

BACKGROUND OF THE INVENTION

A popular pastime for people around the world is observing birds. An old and successful technique for attracting birds for viewing is to suspend a bird feeder from a tree branch or other elevated member in plain view of the observer.

Existing bird feeders take a wide variety of forms, but typically include a cylindrical, rectangular, or frusto-conical shaped dispenser, the lower end of which is formed into, or is attached to, a receptacle. The dispenser has an inlet at or near its upper end for receiving bird seed and an outlet at or near its lower end for dispensing bird seed. Bird seed gravitationally dispenses from the dispenser into the receptacle as the bird seed is consumed by birds.

It is often desirable to remove a bird feeder from its location of use to a location for storage for a certain period of time. For example, when natural food is plentiful, as in the warmer months in geographic regions with more distinct seasons, birds may not eat as much, if at all, from bird feeders. One may wish to then place the bird feeder in temporary storage. When natural food is less plentiful, as in the colder months, the bird feeder may be removed from storage and returned to use. Conventional bird feeders occupy a significant amount of storage space because of their high profile, bulky construction and limited collapsibility. Accordingly, it would be desirable to provide a bird feeder having a low profile for storage.

Similarly, such conventional bird feeders typically are rigid or bulky to package, ship, store and display for sale, or if packaged in pieces, require assembly by the retailer or user. A bird feeder with a low profile that is readily collapsible would reduce such packaging, shipping, storage and display costs and space requirements.

Moreover, it is desirable to have bird feeders that are aesthetically pleasing. Often, bird feeders are bulky or large or poorly colored and not particularly attractive to a human observer.

SUMMARY OF THE INVENTION

These and other problems are addressed by the bird feeder of the present invention. In one embodiment, a bird feeder is provided that includes:
  (a) a flexible dispenser having an input for receiving bird seed and an output for dispensing bird seed in communication with said input;
  (b) a receptacle located below said output of said dispenser for the dispensed bird seed; and
  (c) at least one attachment member for flexibly attaching said receptacle to and suspending said receptacle from said dispenser, wherein when said dispenser is empty, said dispenser is collapsible and at least partially receivable in said receptacle to provide a low profile.

The dispenser can be formed from any flexible material, and preferably is formed from water resistant or waterproof fabrics. As used herein, "fabric" refers to a material made from mechanically interlocked fibers, filaments, yarns, or threads, such as by weaving, knitting, felting and the like. In one configuration, the dispenser is formed from natural and/or synthetic (e.g., thermoplastic) fibers, preferably waterproof Such fibers include a polyamide (e.g., nylon etc.), cellulose (e.g., flax, hemp, rayon, cotton, jute etc.), polyester (e.g., dacron, mylar, etc.), animal skin or hair (e.g., wool, equine hair, fox hair, mink hair, leather, etc.), polypropylene, polystyrene, polyethylene (e.g., polytetrafluoroethylene), polyurethane, polyether, formaldehyde, vinyl (e.g., polyvinyl chloride, etc.), glass (e.g., fiberglass, etc.) graphite, polyacetate, polycarborate, silk, among others. The receptacle may be composed of any rigid, semi-rigid or flexible material, or a combination thereof The receptacle is designed to hold bird seed, to maintain a desired distance from the dispenser, and to provide a structure on which a bird may perch. In one configuration, the receptacle is composed of at least one of metal, plastic, wood, fabric or any other rigid, semi-rigid or flexible material or combination thereof In another embodiment, the receptacle is constructed of one or more flexible materials, preferably the same material used in the construction of the dispenser, and most preferably comprising a stiffening element for support.

The receptacle may be any number of shapes and configurations. For example, in horizontal cross-section, the receptacle may be square, triangular, polygonal, oval, among other shapes and preferably is circular. The receptacle may be flat, but preferably has some depth in order to hold a desired quantity of bird seed in operation and also to hold at least a portion of the dispenser when collapsed. The receptacle may also have holes, other openings or other mechanisms to allow water to drain from the receptacle.

For convenience, the dispenser may include a drawstring, clamp, zipper (such as a "ZIPLOCK"-type device), hook and loop fastener, or other closure device to selectively open or close the input before or after the dispenser is filled with bird seed. All or part of the closure may also function to connect the bird feeder to an object. For example, the closure may be a drawstring that, upon closure, forms a loop that can be attached to an object, directly or indirectly such as with a S-shaped hook or the like, thereby suspending the bird feeder.

To facilitate flow of the bird seed through the output and into the container, the dispenser in one configuration tapers downwardly from a position above the output to the output. For example, a middle portion of the dispenser has a horizontal cross-sectional area that is greater than a horizontal cross-sectional area of the output to control the flow of bird seed from the dispenser. The middle portion is, of course, located above the output. The dispenser above the middle portion may have the same, greater, or even lesser cross-sectional area than that of the middle portion.

To help control a rate of dispensing of bird seed from the dispenser and the receptacle from overflowing with bird seed, an upper edge of the receptacle is preferably located above the lowermost edge (or mouth) of the outlet. Also, to provide the outlet of the dispenser with a more stable or consistent size and shape and thereby facilitate consistent flow from the dispenser, the outlet of the dispenser may be stiffened, e.g., by folding over a portion of the dispenser to double the thickness of the material, by adding another material near the outlet, or by constructing a dispenser with material near the outlet that is less flexible than other portions of the dispenser.

The attachment member typically includes at least three and more typically at least four lengths of chain, wire, fabric, cord or the like. As used herein, "cord" refers to any elongated filament or fiber or collection thereof such as rope, thread, yarn, etc. As will be appreciated, other types of flexible, semi-rigid, or rigid elongated members can be used as the attachment member. For example, a semi-rigid or rigid member may be folded, removed or telescopically reduced in length, thereby facilitating the collapse of at least a portion of the dispenser into the receptacle, or in alternative embodiments, the collapse of at least a portion of the receptacle into the dispenser. Also, the attachment member may be releasably attached and then removed as desired.

Attachment members of differing lengths may be provided, or preferably the attachment members may be adjustable in length. A portion of the dispenser and/or the receptacle may alternatively extend towards the other. Attachment members of different lengths or that are adjustable in length facilitate providing the proper distance between the dispenser and the receptacle, which is dependent on the size and shape of the outlet opening of the dispenser. A variety of combinations of dispensers and receptacles may then be provided, with the attachment member changed or adjusted to the appropriate length. The attachment members may be adjustable in a variety of ways, including the use of a telescoping or folding attachment member, or a flexible attachment member having one or more rubber O-rings, a bar through the attachment member, a mechanical grip, a spring, a toggle, a knot, or a barb to adust the length thereof.

In one configuration, the points of attachment of the lengths of attachment member to the dispenser are located in a substantially horizontal plane to provide stability to the bird feeder when suspended.

In another embodiment, a bird feeder is provided that includes:
(a) a dispenser having an input for receiving bird seed and an output for dispensing bird seed in communication with said input, a vertical center axis of said output being substantially collinear with a vertical center axis of said dispenser;
(b) a container for the dispensed bird seed, the container being located below the output; and
(c) at least one attachment member for attaching the container to and suspending the container from the dispenser;
wherein at least one of the dispenser and the container is at least partially collapsible.

The dispenser maybe rigid, semirigid, or flexible, or a combination thereof Similarly, the container may be rigid, semirigid, or flexible, or a combination thereof. For example, the dispenser or the container may be constructed of wood, metal, a wide variety of plastics (from rigid to semirigid to flexible), and/or fabric, or combinations thereof The container also may be constructed of the same or different materials as the dispenser, e.g., a fabric dispenser and a semirigid plastic container, a fabric dispenser and a fabric container, a rigid dispenser and a rigid container, and many other combinations.

The bird feeder may also comprise a horizontal cross-sectional area of the output that is less than the horizontal cross-sectional area of a portion of the dispenser located above the output to control the flow of bird seed from said dispenser. A vertical center axis of the output is substantially collinear with a vertical center axis of the dispenser to inhibit blockages or impediments to the flow of bird seed through the outlet and into the container.

In yet another embodiment, a method for storing a bird feeder is provided that includes the steps of
(a) providing a dispenser for containing and dispensing bird seed movably engaged to a receptacle for receiving bird seed;
(b) collapsing at least a portion of the dispenser; and
(c) placing at least a portion of the dispenser in the receptacle.

After placement of the collapsed dispenser in the receptacle, the profile of the bird feeder essentially becomes the profile of the receptacle. As will be appreciated, the receptacle is typically bowl-, pan-, pot-, box-, or saucer-shaped and therefore normally has a low profile. In the example of a flexible, fabric receptacle, the profile of the bird feeder may collapse to any number of folded, balled, or stuffed shapes, including by placing the collapsed bird feeder into another container for storage, shipping, display, or the like.

To erect the birdfeeder, the method can further include the steps of;
(a) removing said dispenser from said receptacle;
(b) returning said dispenser to a non-collapsed position;
(c) placing bird seed in said dispenser; and
(d) suspending said dispenser for access by birds.

Because the receptacle is typically suspended from the dispenser, the collapsing step often includes the substep of folding at least one flexible attachment member connecting the dispenser to the receptacle. At least a portion of the flexible members are generally received in the receptacle with the collapsed dispenser.

DETAILED DESCRIPTION

This invention generally relates to bird feeders and, more particularly, to bird feeders with at least one collapsible component.

Figure 1:
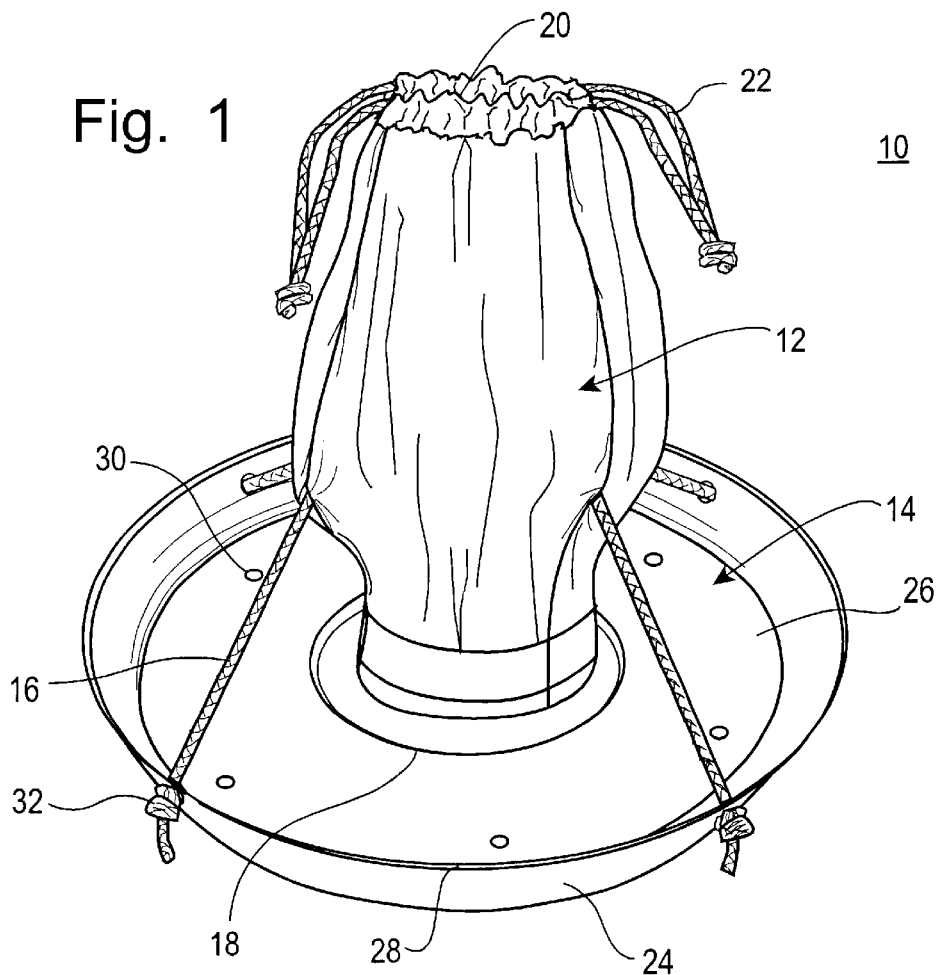
FIG. 1 is a perspective view of a bird feeder of the present invention.
Figure 2:
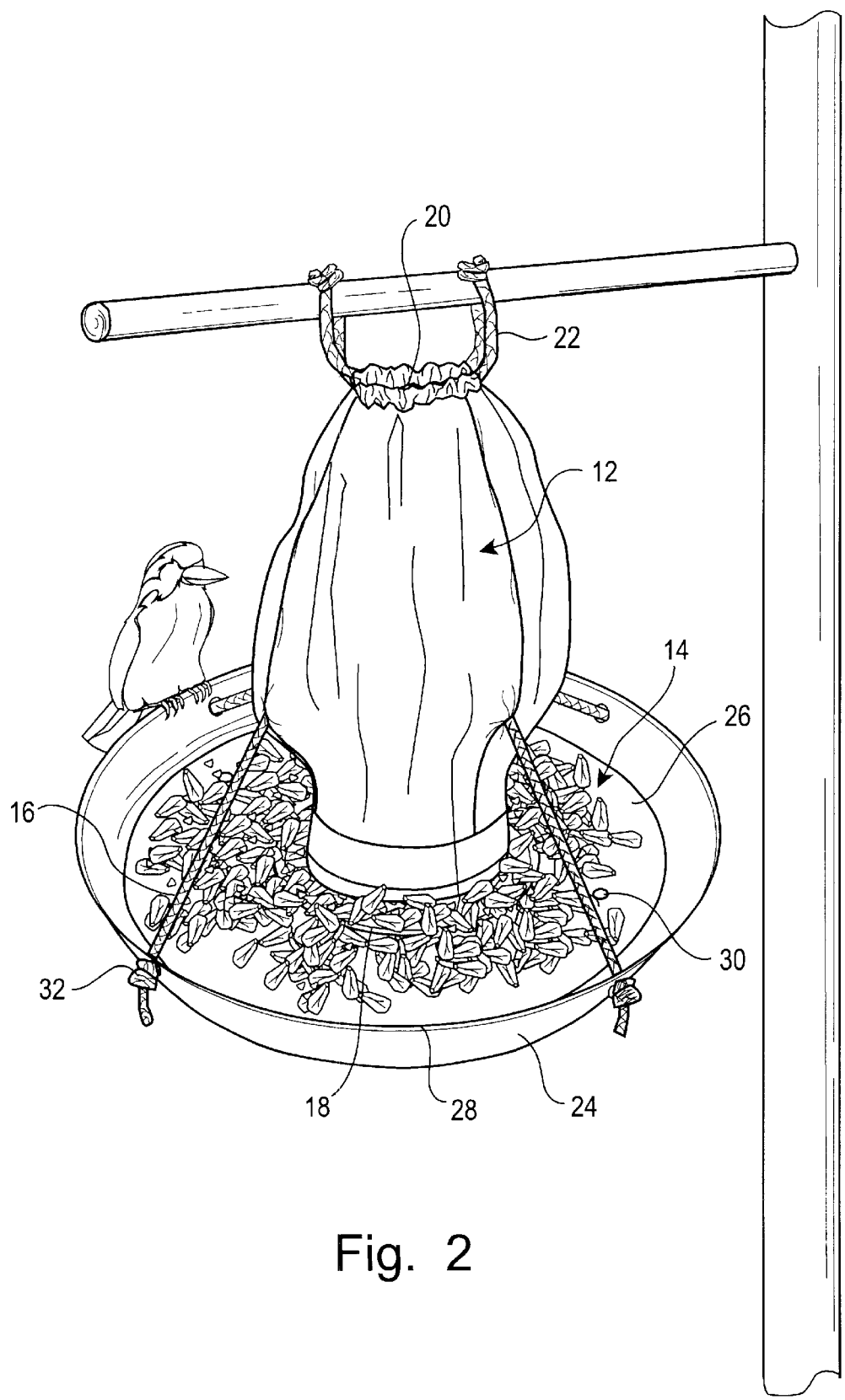
FIG. 2 is a perspective view of the invention depicted in FIG. 1 suspended from a rod and at least partially filled with bird seed.

In one embodiment of the invention shown in FIGS. 1–2, a bird feeder 10 comprises a dispenser 12, a receptacle 14 and at least one connector 16. Preferably, dispenser 12 is at least partially collapsible, and most preferably at least partially collapsible into at least a portion of receptacle 14. Dispenser 12 may be constructed of rigid, semirigid or flexible material. If rigid or semirigid, dispenser 12 may be at least partially collapsible by utilizing accordion-like creases, hinges, folds, or other mechanical devices. Preferably, dispenser 12 is constructed of a flexible material, such as water resistant or water proof fabric. Most preferably, dispenser 12 is constructed of 200 denier nylon pack cloth or polyester. These materials are widely available in a variety of colors, relatively inexpensive, workable in a manufacturing setting, and adaptable to construct dispensers in a variety of different shapes and sizes.

The dispenser 12 may take a wide variety of shapes and sizes, and preferably is generally elongated with an outlet 18 and an inlet 20. The shape and size of the dispenser 12, outlet 18 and inlet 20 depends in large part on the quantity of bird seed desired to be left between fillings, the size and type of bird seed desired to be used, and the size of birds desired to be attracted to the bird feeder. For a typical household or backyard use, the dispenser 12 preferably is approximately 4–24 inches long, and most preferably is approximately 6–8 inches long.

Above the outlet 18, the horizontal cross section of the dispenser 12 preferably is approximately 2–8 inches wide and is circular or approximately circular. The diameter of the horizontal cross section of the dispenser 12 may be different at different locations along the vertical axis of the dispenser 12. The dispenser 12 preferably is constructed of two or more, most preferably four, panels of 200 denier nylon pack cloth stitched or otherwise connected together. In general, as the number of panels increase, the horizontal cross section may be constructed to become more circular. To create a wide variety of aesthetically pleasing bird feeders, the panels may be the same color or design, or alternatively, may be of different or alternating colors or designs.

The horizontal cross section of outlet 18 may be a variety of shapes, most preferably is circular or approximately circular, and preferably is approximately 1–4 inches wide. The outlet 18 preferably includes a stiffening element around at least a portion of the outlet 18, most preferably nylon webbing approximately 1 inch wide around the circumference of the outlet 18.

The dispenser 12 also comprises an inlet 20, through which bird seed may be introduced into the dispenser 12. The inlet 20 may be located in a variety of positions, and preferably is located at the top end of the dispenser 12 opposite from the outlet 18. The inlet 20 may be open or capable of being partially or completely closed. If the inlet 20 is open or left open by not closing, bird seed contained within the dispenser 12 is susceptible to damage or loss by the elements, spillage, squirrels, etc. To provide protection against such damage or loss, the bird feeder 10 may include a cover, lid, flap, or other such device, or preferably a closure 22 to selectively open and close the inlet 20. The closure 22 may be a hook and loop fastener, clamp, zipper, snaps, hooks, buttons, or any of a number of fasteners, with or without an overhanging flap. Most preferably, the closure 22 comprises a drawstring that cinches the inlet 20 into a closed position and also forms at least one, and preferably two, members for connecting the bird feeder 10 to a structure, as shown in FIG. 2.

Figure 3:
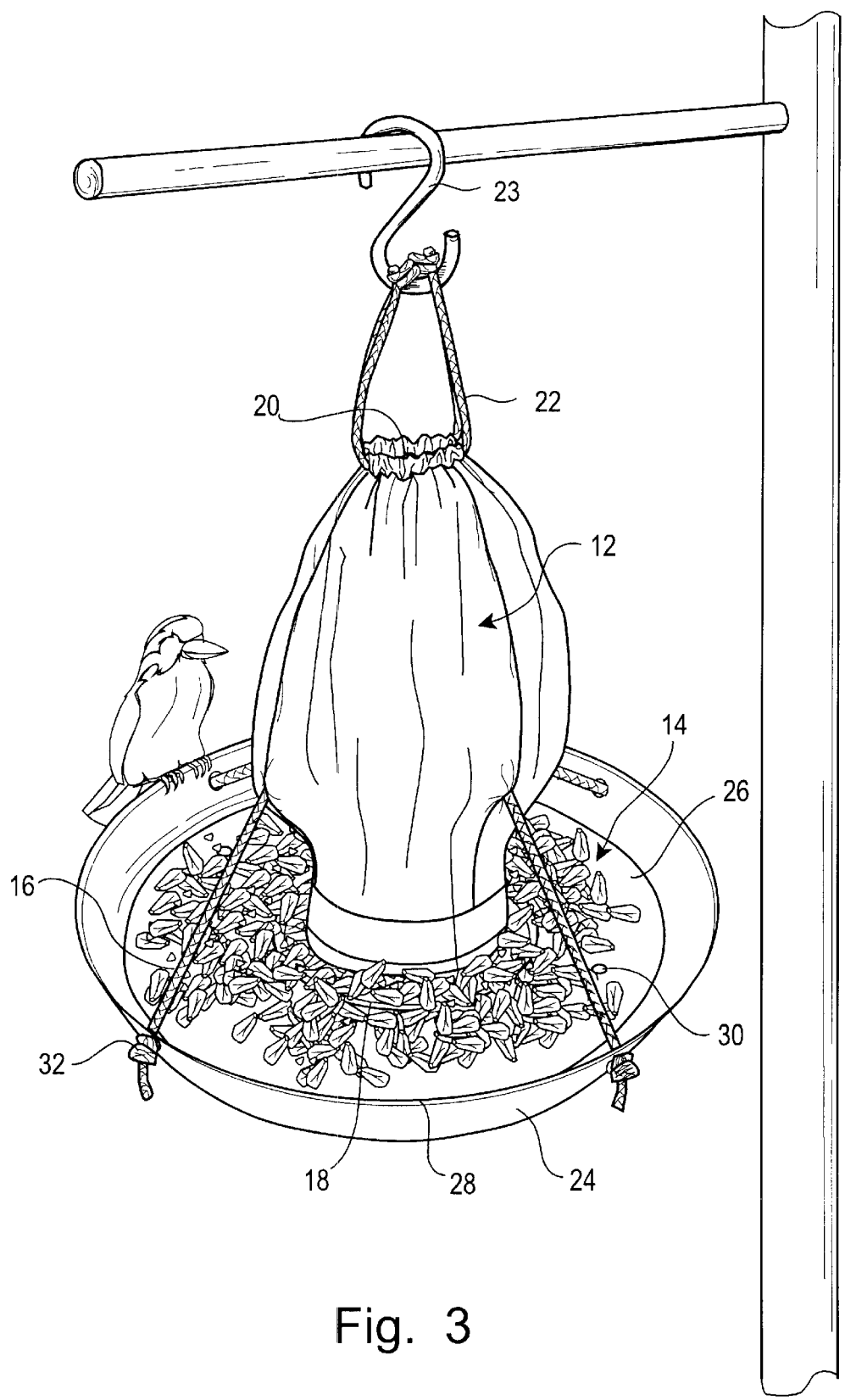
FIG. 3 is a perspective view of another embodiment of the invention suspended from a rod and at least partially filled with bird seed.

Alternatively, as shown in FIG. 3, closure 22 comprises a drawstring that circles the inlet 20 into a closed position and forms a loop by which an S-shaped hook 23 is able to connect the bird feeder to a structure. Any number of mechanisms known in the art may be employed to similarly suspend the bird feeder from a tree limb, rod or other structure.

The bird feeder 10 may also comprise a structure (not shown) to attempt to thwart undesired animals, such as squirrels, from eating the bird seed. Because such unwanted consumption typically results from the animal climbing down from a position above a suspended bird feeder, such a structure preferably is located above the dispenser 12 when in operation. The structure, typically referred to as a "squirrel guard," may be a variety of shapes, preferably is conical or frusto-conical, and may be rigid, semirigid, or flexible.

The receptacle 14 is designed to receive bird seed from the dispenser 12, to hold the bird seed for consumption by birds, to maintain a desired distance from the dispenser 12, and to provide a structure on which a bird may perch. The receptacle 14 may be constructed of a rigid, semirigid, or flexible material, and preferably is constructed of a semirigid material, such as injection molded, extruded or blow molded plastic.

The receptacle 14 may take a wide variety of shapes and sizes, including oval, triangular, square, or other polygonal or non-polygonal shapes in horizontal cross-section and preferably is substantially circular in horizontal cross-section. The size of the receptacle 14 will depend in large part on the amount and type of bird seed desired to be held and the size of the bird desired to be attracted. For a typical backyard application, the receptacle 14 preferably is approximately 4–16 inches in diameter and most preferably is approximately 8–12 inches in diameter.

The receptacle 14 also preferably has some depth, in order to hold the bird seed in operation and to contain at least a portion of the dispenser 12 when not in operation, such as storage or packaging. In the embodiment shown in FIGS. 1 and 2, the receptacle 14 comprises a sidewall 24 extending from the base 26 to provide such depth to the receptacle 14. The sidewall 24 terminates at a lip 28, which is a structure on which a bird may perch while feeding. Preferably, during operation, the uppermost portion (here, the lip 28) of the receptacle 14 is positioned above the outlet 18 of the dispenser 12, in order to help control the flow of bird seed into the receptacle 14.

In addition, the receptacle 14 may include one or more holes 30 to allow water to drain from the receptacle 14, while holding bird seed. The holes 30 should not be so large as to allow bird seed to fall from the receptacle 14, and preferably are approximately ⅛ inch to ½ inch in diameter.

The dispenser 12 is connected to the receptacle 14 by one or more connectors 16, preferably at least three connectors 16 and most preferably four connectors 16. During operation, the connectors 16 are designed to hold the outlet 18 of dispenser 12 a desired distance above the receptacle 14 during operation of the bird feeder 10. This distance will depend on a variety of factors, but primarily depends on the horizontal cross sectional area of the outlet. For a dispenser having a substantially circular outlet of approximately 2 inches in diameter, the distance between the bottom of the dispenser and the base 26 of the receptacle 14 is preferably about ⅜ inch to ¾ inch.

Also, the connectors 16 facilitate the desired low profile of the bird feeder 10 during storage or packaging by being collapsible, retractable, removable, etc. Preferably, the connectors 16 are constructed of flexible nylon cord.

One end of each of the connectors 16 is attached to the dispenser 12 by a variety of ways, including by extending the body of the dispenser 12. Preferably, connector 16 is attached by stitching between two of the panels of dispenser 12.

Figure 5:
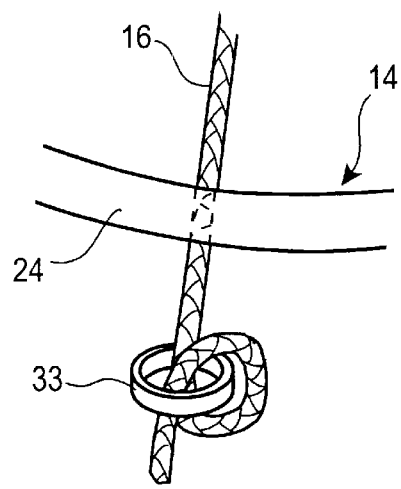
FIG. 5 is a perspective view of a portion of a receptacle and an attachment member with an adjusting member of the present invention.

The other end of each of the connectors 16 is attached to the receptacle 14 by a variety of ways, including use of one or more rubber O-rings, a bar through the attachment member, a mechanical grip, a spring, a toggle, or a knot 32, among other ways. For example, as shown in FIG. 5, the connector 16 passes through the sidewall 24 of receptacle 14, through a rubber O-ring 33, and then looped again through the rubber O-ring 33. Preferably, connector 16 passes through a hole in the sidewall 24 and/or the lip 28 of receptacle 14 and is formed into a knot 32. By any of these devices, the connector 16 maybe set at a desired length, e.g. during the manufacturing process, or, alternatively, be adjustable in length. The adjustability of the length of the connectors 16 provides greater flexibility and lower cost in manufacturing by allowing the same or similar connectors 16 to be used in connection with dispensers of a wide variety of sizes and shapes. Such adjustability also allows the user to adjust the distance between the dispenser and the receptacle for particular applications, such as finer or coarser bird seed, faster or slower dispensing, or other adaptations to the bird feeder.

Figure 4:
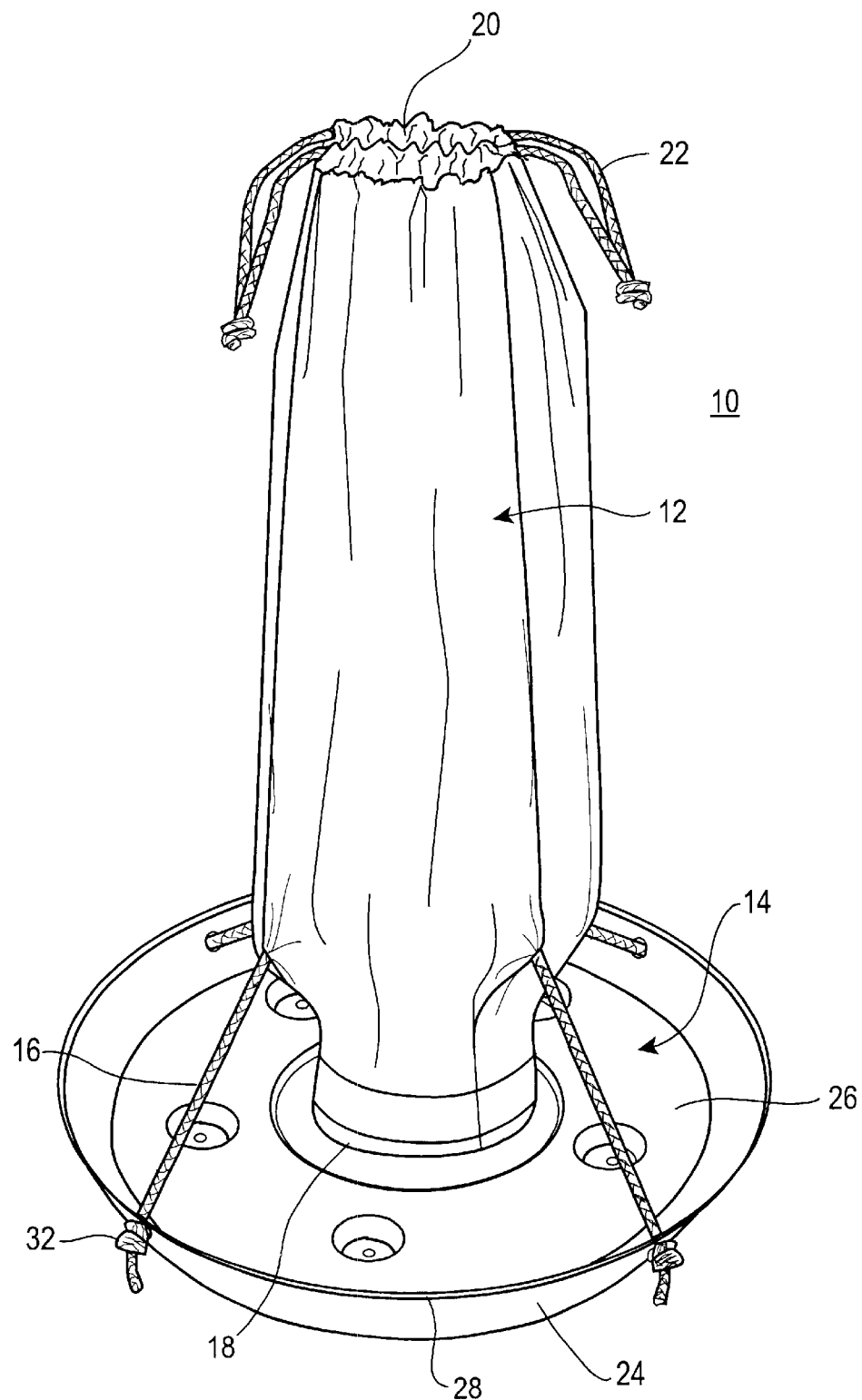
FIG. 4 is a perspective view of another embodiment of the bird feeder of the present invention.

An alternative embodiment of the invention is depicted in FIG. 4, in which the dispenser 12 is an alternative size and shape, with corresponding alternative sizes and shapes of the receptacle 14 and the connectors 16. As described previously, the embodiment shown in FIG. 4 is capable of holding a larger quantity of bird seed and of supporting a larger bird than the embodiment depicted in FIGS. 1 and 2. This may be desirable for a variety of reasons, including increasing the time period between filling the dispenser 12, attracting a larger bird, using a heavier or different type of bird seed, among others.

Figure 6:
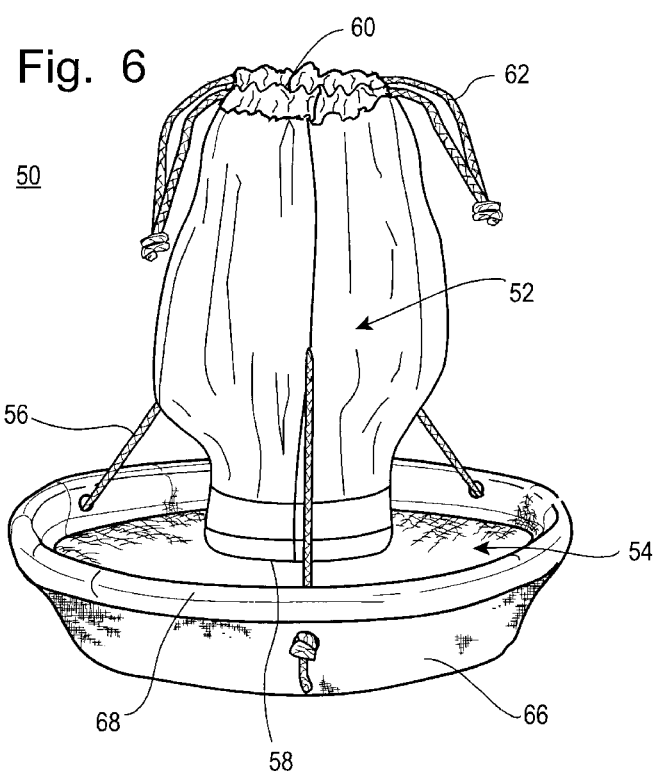
FIG. 6 is a perspective view of another embodiment of the bird feeder of the present invention.
Figure 7:
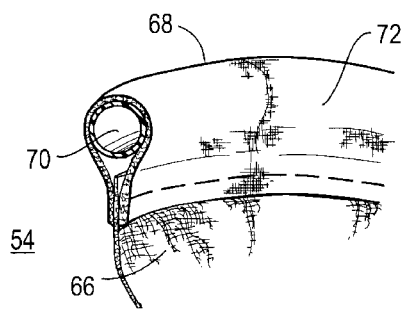
FIG. 7 is a perspective cross sectional view of a portion of the receptacle of the bird feeder of the embodiment of the invention depicted in FIG. 6.

Yet another embodiment of the invention is depicted in FIGS. 6 and 7. A bird feeder 50 comprises a dispenser 52 attached to a receptacle 54 by connectors 56. The dispenser 52 comprises an inlet 60, preferably with a closure 62 to selectively open and close the inlet 60, to introduce bird seed into the dispenser 52, and an outlet 58 to gravitationally dispense bird seed into the receptacle 54 to replenish the bird seed consumed by birds. The characteristics of each of these elements may take any of the forms as described above in the specification.

In this embodiment, as best shown in FIG. 7, the receptacle 54 comprises a flexible base 66 and a stiffener 70. Preferably, the base 66 is constructed of fabric or other flexible material, most preferably a nylon mesh which is sufficiently fine to allow water, but not significant amounts of bird seed, to pass through.

Stiffener 70 is designed to provide structural support along at least a portion of the circumference of the receptacle 54, and preferably along the entire circumference. Most preferably, stiffener 70 forms the receptacle 54 into an approximately circular horizontal cross section at its lip 68. Stiffener 70 is preferably constructed of a material that provides some rigidity to the receptacle 54, most preferably while being at least longitudinally pliable to bend into the preferred circular shape. Most preferably, stiffener 70 is constructed of approximately ⅝ inch diameter vinyl tubing.

Stiffener 70 may be connected to the base 66 in a variety of ways, including by hook and loop fasteners, adhesives, staples, as is known in the art. Preferably, at least a portion of stiffener 70 is enclosed by fabric or other flexible material, which in turn is attached to the base 66 along at least a portion of its circumference. Most preferably, and as shown best in FIG. 7, stiffener 70 is encompassed by fabric 72, which in turn is stitched to the base 66, preferably along the entire circular circumference of base 66.

In yet another embodiment, a method for storing or packaging a bird feeder is provided that includes the steps of providing a dispenser for containing and dispensing bird seed movably engaged to a receptacle for receiving bird seed, collapsing at least a portion of the dispenser, and placing at least a portion of the dispenser in the receptacle. After placing at least a portion of the collapsed dispenser in the receptacle, the profile of the bird feeder become more like the profile of the receptacle. As will be appreciated, the receptacle is typically bowl-, pan-, pot-, box-, or saucer-shaped and therefore normally has a low profile. In the example of the dispenser and receptacle both being flexible fabric, the profile of the bird feeder may collapse to any number of folded, balled, or stuffed shapes, including by placing the collapsed bird feeder into another container for storage, shipping, display, or the like.

In a preferred embodiment, the dispenser is constructed of one or more flexible materials, most preferably 200 denier pack cloth nylon and the receptacle is constructed of semi-rigid plastic, most preferably in the shape of a shallow bowl, e.g. less than about 2 inches deep. Preferably, the dispenser and the receptacle are attached by at least 3, and most preferably 4, flexible cords. The dispenser may then be collapsed and at least of portion thereof, most preferably substantially all, may be placed within the receptacle. Most preferably, the dispenser is empty or emptied of bird seed before placing it into the receptacle. In addition to facilitating the placement of the dispenser into the receptacle, the flexible cords may also be placed, in all or part, into the receptacle as well. The profile of the bird feeder then essentially is the profile of the receptacle, which is a lower profile for better storage, packaging, shipping, displaying and selling. The bird feeder may be stored, packaged or otherwise placed in a use other than attracting and feeding birds.

To erect the bird feeder, the method can further include the steps of removing the dispenser from the receptacle, returning the dispenser to a non-collapsed position, placing bird seed in the dispenser and suspending the dispenser for access by birds.

The foregoing description of the present invention has been presented for purposes of illustration and description. The description is not intended to limit the invention to the form disclosed herein. Consequently, variations and modifications commensurate with the above teachings, and the skill or knowledge of the relevant art, are within the scope of the present invention. The embodiment described herein is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

I claim:

1. A bird feeder, comprising:
   (a) a flexible dispenser having an input for receiving bird seed and an output for dispensing bird seed in communication with said input, wherein said dispenser comprises a closure to selectively close and open said input and wherein said closure comprises a drawstring;
   (b) a receptacle located below said output of said dispenser for the dispensed bird seed; and
   (c) at least one attachment member for flexibly attaching said receptacle to and suspending said receptacle from said dispenser, wherein when said dispenser is empty, said dispenser is collapsible and at least partially receivable in said receptacle.

2. A bird feeder, comprising:
   (a) a dispenser having an input for receiving bird seed and an output for dispensing bird seed in communication with said input, a vertical center axis of said output being substantially collinear with a vertical center axis of said dispenser, wherein said dispenser comprises a closure to selectively close and open said input and wherein said closure comprises a drawstring;
   (b) a container for the dispensed bird seed, said container being located below said output; and (c) at least one attachment member for attaching said container to and suspending said container from said dispenser;
   wherein at least one of said dispenser and said container is at least partially collapsible.

3. A bird feeder, comprising:
(a) a dispenser having an input for receiving bird seed and an output for dispensing bird seed in communication with said input, a vertical center axis of said output being substantially collinear with a vertical center axis of said dispenser, wherein said dispenser comprises a closure to selectively close and open said input and wherein said dispenser is at least partially formed from a flexible fabric;
(b) a container for the dispensed bird seed, said container being located below said output; and
(c) at least one attachment member for attaching said container to and suspending said container from said dispenser;
   wherein at least one of said dispenser and said container is at least partially collapsible.

4. A method for storing a bird feeder, comprising:
(a) providing a dispenser for containing and dispensing bird seed movably engaged to a receptacle for receiving bird seed;
(b) collapsing at least a portion of said dispenser by folding at least one attachment member connecting said dispenser to said receptacle; and
(c) placing at least a portion of said dispenser in said receptacle.

* * * * *